Oct. 30, 1962     J. T. PARRETT     3,060,767

SPEED CHANGING MECHANISM

Original Filed May 25, 1954     2 Sheets-Sheet 1

INVENTOR
JOHN THOMAS PARRETT
BY Moore, Prangley & Clayton

ATTORNEYS

Oct. 30, 1962  J. T. PARRETT  3,060,767
SPEED CHANGING MECHANISM
Original Filed May 25, 1954  2 Sheets-Sheet 2
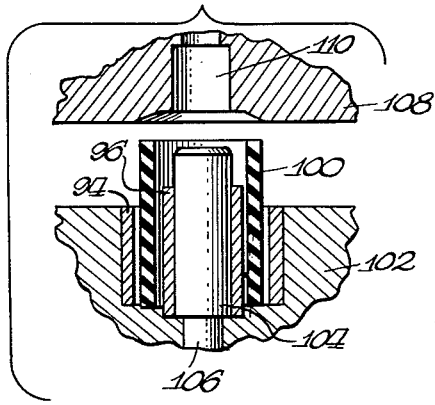
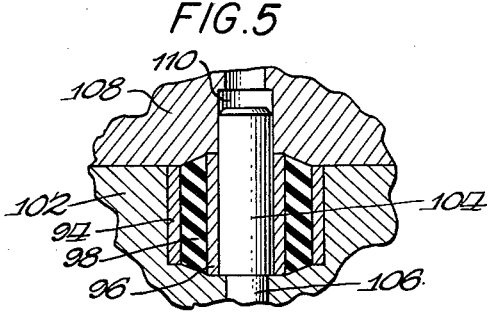
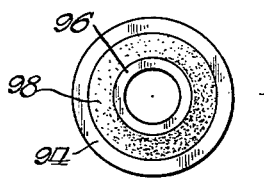
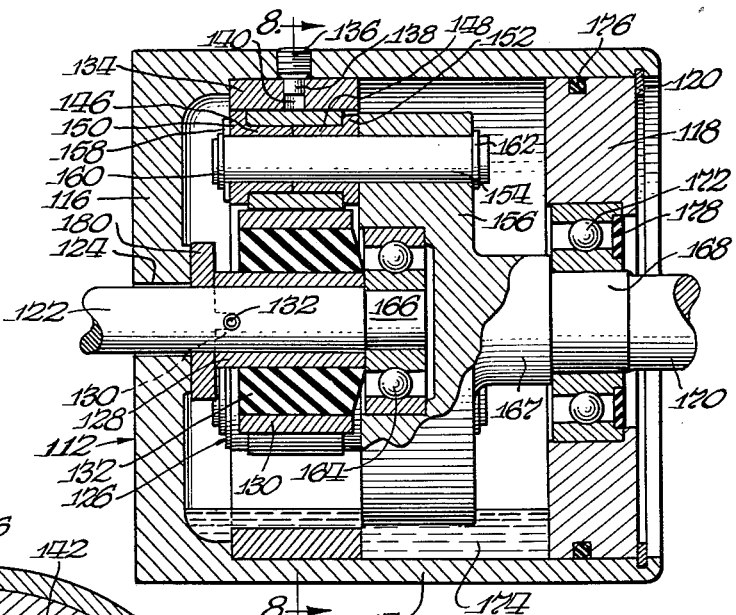
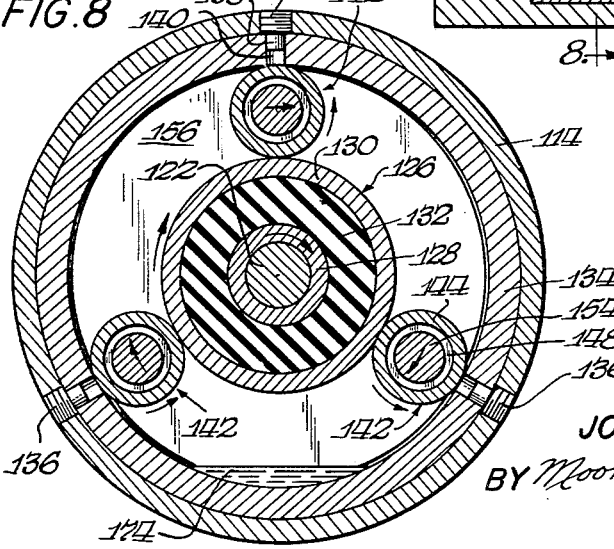
INVENTOR
JOHN THOMAS PARRETT
BY Moore, Prangley & Clayton
ATTORNEYS 3,060,767
SPEED CHANGING MECHANISM
John Thomas Parrett, P.O. Box 684,
Benton Harbor, Mich.
Continuation of application Ser. No. 432,098, May 25, 1954. This application Apr. 15, 1959, Ser. No. 806,694
8 Claims. (Cl. 74—798)

This invention relates to speed change mechanisms of the planetary type and particularly to planetary speed change mechanisms in which one of the operating members is resilient and easily deformable.

The present invention relates to planetary speed change devices which employ a sun roller disposed within a circular outer ring. A plurality of planetary rollers is positioned between the sun roller and the outer ring, the planetary rollers being pressed between the sun roller and the outer ring to provide a driving contact therebetween. The planetary rollers drive crank members which are mounted on a crank plate so that movement of the planetary rollers drives the crank plate.

In planetary speed change devices of the type set forth above it is desirable that at least two and preferably three of the three interacting members, i.e., two of the three members including the outer ring, the planetary rollers and the sun rollers, be deformable so that driving pressure between these elements can be maintained at as high a value as possible in order to obtain the necessary transmission of force. In order to provide sufficient allowance for wear and in order to prevent slippage between the contacting surfaces, it is desirable that the deflection of the contacting parts be as great as possible. Practical considerations of the fatigue life of the material and the heat generated by elastic hysteresis limit the amount of usable deflection. For these reasons it is necessary that at least two of the contacting elements undergo elastic deformation and it is preferred that all three of the contacting elements undergo elastic deformation.

It is further desirable that the contacting surfaces be cylindrical in form throughout the contacting area so that as pure rolling contact is obtained as possible. Such a construction eliminates friction losses of the type which do not contribute directly to operation of the speed change mechanism. Such cylindrical surfaces are also desirable because they can be finished by the conventional centerless grinding method to produce the high degree of surface smoothnness required for proper operation of this type of speed change mechanism.

Even though centerless grinding methods are utilized to grind the contacting surfaces, slight inaccuracies in the grinding surfaces will appear and it is for this reason that a guiding and restraining scheme must be utilized to prevent relative axial movement of the contacting members. The guiding must be accomplished with small frictional losses but must be positive. It is also desirable that at least one of the contacting members be capable of slight wander in a controlled manner to minimize the effect of any inaccuracies in the contacting surfaces.

In speed change mechanisms in which lower speed ratios are desired, i.e., when the diameter of the sun roller is relatively large compared to the diameter of the planetary rollers, it is desirable that the construction of the sun roller permit substantial deffection of this member in a diametral direction to facilitate pre-stressing thereof into the deflected condition during assembly so as to provide high torque transmission without slipping, while using a wear resistant traction material for the sun roller. This adds to the total available deflection to provide driving pressure without impairing the life expectancy of any of the component parts.

Accordingly, it is an object of the present invention to provide an improved speed change mechanism of the type set forth in which at least two of the contacting members undergo deflection during operation to provide driving contact.

In connection with the foregoing object it is another object of the invention to provide an improved sun roller and an improved planetary roller that will permit substantial radial deflection in a controlled manner to facilitate pre-stressing thereof into the deflected condition during assembly so as to provide high torque transmission without slipping, while using a wear resistant traction material for the sun roller.

Still another object of the invention is to provide a planetary roller structure in speed change mechanisms of the type set forth, the contacting surfaces of which can be ground by the conventional centerless grinding method, and which includes structure to permit positive guidance in an axial direction of the planetary rollers with respect to the associated contacting parts.

Yet another object of the invention is to provide an improved sun roller which is capable of substantial diametral deflection to facilitate pre-stressing thereof into the deflected condition during assembly so as to provide high torque transmission without slipping, while using a wear resistant traction material for the sun rollers.

These and other objects and advantages of the invention will be better understood from the following description when taken in conjunction with the accompanying drawings. In the drawings wherein like reference numerals have been utilized to indicate like parts throughout:

FIG. 4 is a view illustrating the parts of the planetary roller of FIG. 3 before the parts are assembled under elevated temperature and pressure;

FIG. 5 is a view similar to FIG. 4 showing the parts of the planetary roller of FIG. 3 assembled under elevated temperature and pressure;

FIG. 6 is an end view of the planetary roller illustrated in FIG. 3;

FIG. 7 is a view in vertical section of another preferred form of the present invention; and FIG. 8 is a view in vertical section of the form of invention shown in FIG. 7 substantially as seen in the direction of the arrows along the line 8—8 of FIG. 7.

Figure 1:
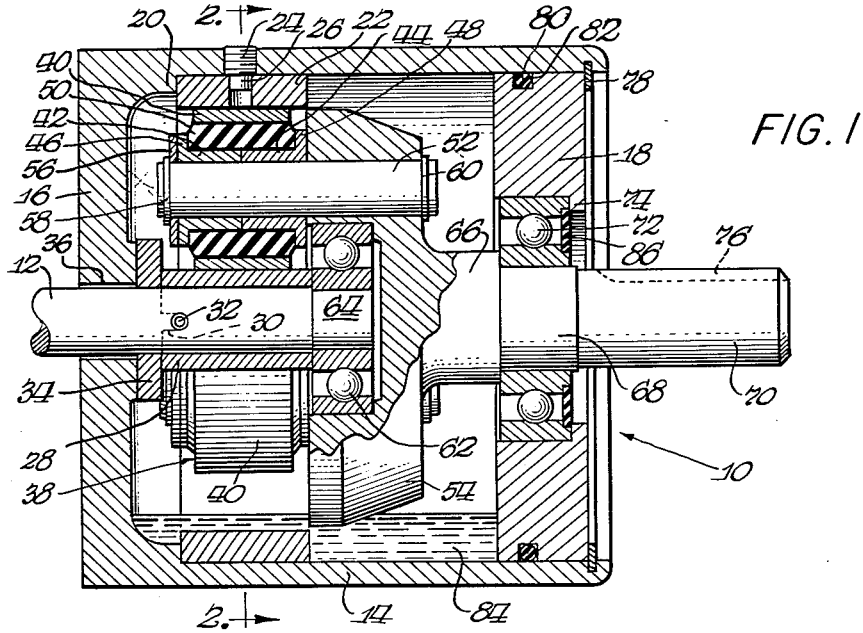
FIG. 1 is a view in vertical section of one preferred form of speed change mechanism made in accordance with and embodying the principles of the present invention.
Figure 2:
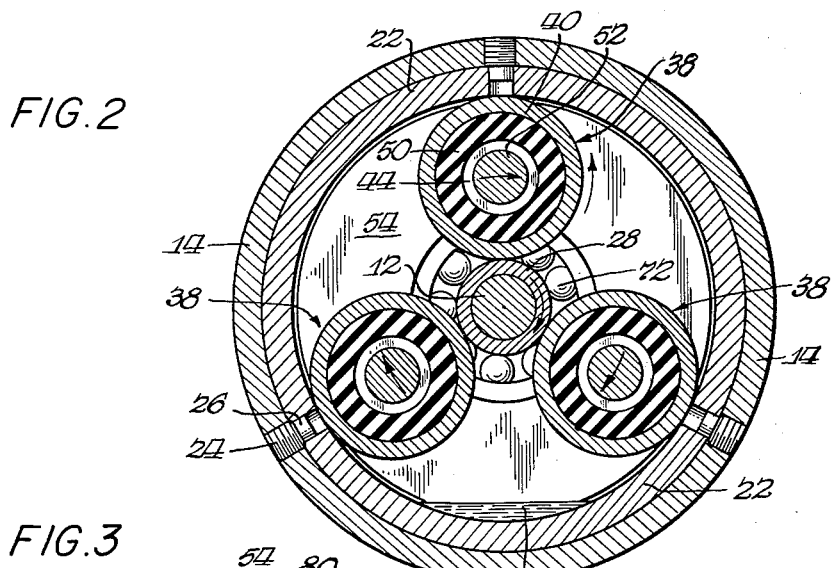
FIG. 2 is a view in vertical section of the speed change mechanism in FIG. 1 substantially as seen in the direction of the arrows along the line 2—2 of FIG. 1.

Referring to the drawings and particularly to FIGS. 1 and 2 there is shown a speed change mechanism generally designated by the numeral 10 made in accordance with and embodying the principles of the present invention. Speed change mechanism 10 is adapted to be used in conjunction with a motor (not shown) having a motor output shaft 12. The purpose of the speed change mechanism 10 is to convert the relatively high speed rotation of the shaft 12 to a relatively slower speed rotation with as small a loss of energy as possible.

A hollow substantially cylindrical housing 14 is provided for the speed change mechanism 10. The left hand end of the housing 14 as viewed in FIG. 1 is closed by a wall 16 formed integral with the housing 14. The right hand end of the housing 14 is closed by a removable wall 18.

A shoulder 20 is formed within the housing 14 and is used as a stop against which one edge of an outer ring 22 is placed. The ring 22 is cylindrical and is held in position by a plurality of bolts 24 which threadedly engage the housing 14 and have ends 26 that extend into radial apertures in the outer ring 22. The inner surface of the ring 22 is carefully ground to a smooth surface such as by the conventional centerless grinding method.

At the center of the housing 14 and concentric with the inner surface of the ring 22 is a sun roller 28. The sun roller 28 is cylindrical and has the outer surface thereof carefully finished in any suitable manner such as by the conventional centerless grinding method. An aperture is formed in the center of the sun roller 28 to receive the motor drive shaft 12 and a pair of notches 30 spaced across a diameter of sun roller receives and cooperates with a pin 32 extending through the drive shaft 12. The pin 32 acting in the notches 30 of the sun roller 28 provides a positive drive for the sun roller 28. The left hand end of the sun roller 28 as viewed in FIG. 1 abuts against a bearing washer 34 which surrounds the motor drive shaft 12 and is concentric with an aperture 36 in the wall 16 through which the motor drive shaft 12 extends.

Referring to FIG. 2, it will be seen that three planetary rollers generally designated by the numeral 38 are provided. The same reference numerals will be applied to each of the planetary rollers since these planetary rollers are identical in construction. The contacting surface of the planetary roller 38 is provided by a cylindrical outer member 40 which is hollow and has its outer surface carefully ground and finished, for example by the conventional centerless grinding method, to roll upon and cooperate with the inner surface of the outer ring 22 and the outer surface of the sun roller 28. A bearing is provided for the planetary roller 38 in the form of two identically shaped cylindrical bearing members 42 and 44, see FIG. 1. The outer edge of each of the bearing members 42—44 is provided with an outwardly extending flange 46 and 48, respectively, which provide contact with the adjacent surfaces. The inner edges of the bearing members 42 and 44 preferably abut. The longitudinal extent of the outer member 40 is substantially less than the combined lengths of the bearing members 42—44.

The space between the outer member 40 and the bearing members 42—44 is filled with a body of elastomeric material 50. Since the longitudinal length of the outer members 40 is substantially less than the combined length of the bearing members 42—44, the edges of the elastomer 50 taper from the outer edges of the flanges 46 and 48 to the ends of the outer member 40. The elastomer 50 is firmly bonded to the inner surface of the outer member 40 and the outer surfaces and flanges of the bearing members 42—44. Many different types of elastomers may be used to form the elastomeric member 50. The material chosen must have a low elastic modulus as compared with steel so that a small force applied to the elastomer 50 will cause deflection thereof when the outer member 40 which is formed of steel is deflected during operation. The elastomer 50 must be capable of being bonded to steel and to bronze or other bearing materials of which the bearing members 42—44 are preferably formed. Elastomer behavior must be also exhibited by the elastomer 50 when this member is loaded in shear. Furthermore, the elastomer 50 must remain unaffected as to the above described properties when subjected to prolonged contact with oil or other lubricants. Any oil resistant synthetic organic plastic or rubber can be used successfully to form the elastomer member 50. A preferred type of synthetic rubber is a long chain polymerization product of chloroprene sold under the trade name "neoprene." A commercial specification for a suitable material is the ASTM-SAE Specification No. SC-620ABEK. The method of compounding and molding the elastomer 50 will be described later.

Each of the planetary rollers 38 has a crank pin 52 extending through the bearing members 42—44 and through a supporting aperture in a crank plate 54. A washer 56 is also positioned on the crank pin 52 and abuts the flange 46 of the left hand bearing member 42 to make bearing contact therewith. A split ring washer 58 is provided in a groove on the left hand end of the pin 52 and a similar split ring washer 60 is provided on the right hand end of the pin 52. The washers 56, 58 and 60 hold the planetary roller 38 in operative position upon the crank plate 54. Since the bearing members 42 and 44 are formed of bronze or other suitable bearing material, the planetary rollers easily rotate with respect to the pin 52, the crank plate 54, and the washer 56. A relatively tight fit is provided between these members to the end that axial wander of the planetary rollers 38 is positively restrained since the bearing members 42—44 are positively restrained and this restraint is transmitted through the elastomer 50 to the outer ring 40.

The crank plate 54 is supported on the left hand end as viewed in FIG. 1 by the motor drive shaft 12 and on the right hand end by the wall 18. More particularly, the left hand end of the plate 54 is provided with a generally circular recess which receives a ball bearing assembly 62 which in turn receives and interfits with a reduced portion 64 on the end of the motor drive shaft 12. Extending from the right hand side of the crank plate 54 is a shaft 66 having a reduced portion 68 formed integral therewith and a second integral reduced portion 70. The reduced portion 68 is carried by a ball bearing assembly 72 which is supported within a circular recess in the wall 18, the right hand side of the bearing 72 abutting against an inturned flange 74. The mechanism to be driven by the speed change mechanism is attached to the reduced portion 70 by means of a key slot 76.

The wall 18 is held firmly against the bearing 72 and associated parts by a split ring 78 that fits within an annular groove formed in the inner surface of the housing 14. A fluid tight seal is provided between the wall 18 and the housing 14 by a circular O-ring 80 disposed within an annular groove 82 formed on the circumference of the wall 18, the groove 82 being substantially square in cross section.

A small quantity of lubricating oil indicated by the numeral 84 is included within the housing 14 to provide lubrication for the various moving parts. The oil is retained within the housing 14 by reason of the O-ring 80, an oil seal 86 formed on bearing 72, and the close fit between the sun roller 28, the shaft 12, the washer 34 and the wall 16 at the left hand side of the housing 14.

Referring now particularly to FIG. 2, the manner in which the above described speed change mechanism operates will be explained in detail. Assuming that the sun roller 28 is driven by the motor drive shaft 12 in a clockwise direction as indicated by the arrow, the planetary rollers 38 will be rotated in a counterclockwise direction and in effect will walk around upon the inner surface of the outer ring 22. This action will move the centers of the associated crank pins 52 in a clockwise direction but at a reduced speed as compared to the input shaft 12. The crank pins 52 in turn will drive the crank plate 54 and the associated output shaft 70.

The necessary driving force between the outer ring 22, the sun roller 28 and the planetary rollers 38 will be provided in this form of the invention primarily by diametral deflection of the outer ring 22 and the planetary rollers 38. The total deflection necessary to provide the required driving force will be divided between the outer ring 22 and the planetary rollers 38. The planetary rollers 38 and associated parts are assembled under compression and the parts are progressively deflected during operation. More particularly, the outer member 40 of the planetary rollers 38 is made of steel having sufficient elasticity to permit the necessary deformation. In assembling the speed change mechanism 10, the planetary rollers 38 are deflected or pre-stressed radially by bending before insertion between the outer ring 22 and the sun roller 28. Release of the planetary rollers 38 after assembly causes high pressures to be exerted at the points of contact therefore with the outer ring 22 and the sun roller 28 whereby to obtain high torque drive transmission therebetween without slipping; by using a wear resistant traction material such as steel it is possible to obtain long life operation. The elastomer 50 will not interfere with the diametral deflection of the outer member 40 but will still transmit the necessary driving force from the bearing members 42—44 to the outer member 40.

Axial movement of the sun roller 28 to the left will be positively prevented by the washer 34 and will be prevented to the right by the presence of the ball bearing assembly 62 acting through the crank plate 54 and the ball bearing 72 acting against the wall 18. The bolts 24 will positively prevent movement of the outer ring 22 in a longitudinal axial direction with respect to the housing 14 or the sun roller 28.

Wander of the planetary rollers 38 in an axial direction with respect to the outer ring 22 and the sun roller 28 will be limited and substantially prevented by the bearing members 42—44 acting against the washer 56 and the crank plate 54, these parts all being held firmly assembled by the crank pin 52. A relatively small amount of movement in an axial direction will be permitted on the part of the outer member 40 with respect to the bearing members 42—44 due to the presence of the elastomer 50. This wander however will be controlled and limited.

The presence of the elastomer 50 permits the centers of the crank pins 52 and the associated aperture in the crank plate 54 to be located with greater manufacturing tolerances. More specifically, proper operation of the speed change device 10 is achieved since the elastomer 50 will permit a small displacement of the bearing members 42—44 with respect to the outer member 40 in a radial direction.

Figure 3:
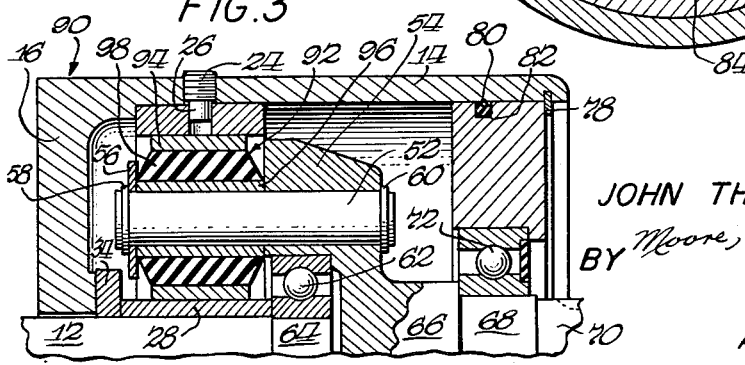
FIG. 3 is a fragmentary view in vertical section similar to FIG. 1 and showing a modified form of planetary roller made in accordance with the invention.

Referring now to FIG. 3 there is shown a speed change mechanism 90 which is constructed substantially the same as the speed change mechanism 10 of FIGS. 1 and 2. The only difference between the speed change mechanism 10 and the speed change mechanism 90 is in the planetary rollers. Accordingly, the same reference numerals have been applied to like parts in FIG. 3.

The planetary roller of FIG. 3 is generally designated by the numeral 92 and includes a substantially cylindrical outer member 94, the outer surface of the member 94 being smooth finished by any suitable methods such as the conventional centerless grinding method. An integral bearing member 96 is provided and is made of bronze or other suitable bearing material. A quantity of elastomer 98 similar in character to the elastomer 50 in FIGS. 1 and 2 is provided between and is adhered to the outer member 94 and the bearing member 96. It will be seen that the longitudinal extent of the outer member 94 is substantially less than that of the bearing member 96 and, accordingly, the edges of the elastomer 98 taper from the ends of the bearing member 96 to the ends of the outer member 94.

It will be seen that the principal difference between the planetary rollers 38 and the planetary rollers 92 is in the bearing member, the bearing member of the roller 92 being one piece and having no outwardly extending flanges on the outer ends thereof. This form of planetary roller is more economical to produce than the planetary roller 38 and gives satisfactory performance in applications where the amount of wander of the planetary rollers that must be restrained is small.

Referring now to FIGS. 4, 5 and 6 the method of molding and manufacturing the planetary rollers 92 will be described in detail. Uncured elastomer materials are first blended then formed into a hollow cylindrical tube and thereafter cut into suitable lengths to provide an uncured elastomer piece 100. The component parts of the planetary roller are then assembled upon a lower mold member 102. The mold member 102 has a cylindrical depression therein having a depth equal to the longitudinal length of the outer member 94. A further depression is made to receive the bearing member 96 so that the bearing member 96 and the outer member 94 are arranged in the proper positions longitudinally with respect to each other.

The uncured elastomer material 100 is then positioned between the outer member 94 and the bearing member 96. The quantity of elastomer in the member 100 is sufficient to fill completely the space between the outer member 94 and the bearing member 96 and provide a small overflow or flash.

The bearing member 94 is held properly centered by a core 104 having a diameter substantially equal to the inner diameter of the bearing member 96. Formed on the lower end of the core 104 is an extension 106 that is received by an aperture in the lower mold 102 to keep the core 104 properly centered with respect thereto. A cooperating upper mold 108 is provided having an aperture 110 formed therein to receive the upper end of the core 104. When the mold members 102 and 108 are fully assembled, they provide a space shaped complementary to that occupied by a finished planetary roller.

Before the parts are assembled, the inner surface of the mold members 102 and 108 are coated with a silicone mold lubricant to prevent the elastomer from adhering thereto. It is desirable to increase and strengthen the bond between the elastomer and the associated surfaces of outer member 94 and bearing member 96. To this end these surfaces are coated with a bonding agent such as a chemical derivative of rubber dispersed in a volatile solvent. A suitable bonding agent of this character is sold under the trade name "Ty-Ply."

After the parts have been assembled as described above, the upper mold member 108 is lowered over the parts under pressure and the mold members are heated. Curing is accomplished by holding the assembly at a temperature of between 250° to 300° F. for ten to fifteen minutes under a pressure of from 500 to 2,000 p.s.i. A typical example of curing is accomplished by holding the assembly for 12 minutes at a temperature of 275° F. under a pressure of 1,000 p.s.i. The elastomer flows to fill the space between the outer member 94 and the bearing member 96 before curing and excess elastomer is removed as flash. After curing, the planetary roller assembly is removed and is ready for use since the outer member 94 was machined before being pressed in the mold.

The planetary rollers 38 of the speed change mechanism 10 are manufactured in a similar manner by using an appropriately shaped mold.

There is shown in FIGS. 7 and 8 another preferred embodiment of the present invention. In this form of the invention the sun roller is made substantially larger in diameter than the associated planetary rollers to achieve a lower speed reduction ratio. In such constructions it is preferable that the sun roller undergo a substantial deflection during use to contribute to the driving force between the various contacting surfaces. This is necessary since the small diameter of the planetary rollers limits the deflection that these members can contribute.

The speed change device of FIGS. 7 and 8 is designated generally by the numeral 112 and includes a hollow cylindrical housing 114 closed at one end by an integral wall 116 and closed at the other end by a removable wall 118. The wall 118 is held in place by a split ring 120 positioned in an annular slot formed on the inner circumference of the housing 114.

The input shaft 122 of a driving motor (not shown) extends through an aperture 124 in the wall 116 and supports a sun roller generally designated by the numeral 126. The sun roller 126 includes a steel sleeve 128 having an inner diameter such as to accommodate the motor drive shaft 122. Slots 130 are formed on the left hand end of the sleeve 128 and cooperate with a pin 132 extending through the shaft 122 whereby the shaft 122 positively drives the sleeve 128.

The driving surface of the planetary roller 126 is provided by an outer steel ring 130, the outer surface of which is carefully finished in any suitable manner such as by the conventional centerless grinding method. Disposed between the sleeve 128 and the ring 130 is a body of elastomer 132 which is bonded to these members and is similar in character to the elastomers 50 and 98 described above. The manner of manufacturing the sun roller 126 is similar to that illustrated in FIGS. 4 to 6, the only difference being the substitution of properly shaped mold members.

There is provided within the housing 114 an outer ring 134 which is held in position thereon by a plurality of bolts 136 threadedly engaged in the housing 114 and having projections 138 extending into apertures 140 in the ring 134. The inner surface of the outer ring 134 is highly machined in any suitable maner as by the conventional centerless grinding method to provide a cylindrical surface.

A plurality of planetary rollers generally designated by the numeral 142 is positioned around the sun roller 126 and between the outer ring 134 and the sun roller 126. Each of the planetary rollers is identical in construction and, accordingly, like reference numerals have been applied to each. The planetary rollers include an outer cylindrical member 144 that has a highly machined outer surface which may be achieved using the conventional centerless grinding method to provide a cylindrical surface. The outer member 144 is supported by a pair of bearing members 146 and 148 which are preferably made of bronze or other good bearing material. The outer end of each of the cylindrical bearing members 146—148 is provided with an outturned integral flange 150 and 152, respectively, the flanges 150 and 152 engaging the ends of the outer member 144.

Each planetary roller 142 is supported by a crank pin 154 extending through apertures in the bearing members 146—148 and through aligned apertures in a crank plate 156. The flange 150 abuts against a washer 158 which is held in place by a split ring 160 positioned in a groove on the pin 154. A similar split ring 162 engages a groove in the other end of the pin 154 and bears against the crank plate 156. The above described construction presses the flanges 150 and 152 against the ends of the outer member 144 so that these three elements rotate as a unit.

The crank plate 156 is supported on the left hand end by a ball bearing assembly 164 received in a recess in the crank plate 156. A reduced portion 166 on the end of the motor drive shaft 122 supports the ball bearing assembly 164 and in turn supports the crank plate 156.

Formed integral with the crank plate 156 and extending outwardly to the right therefrom is a shaft 167 having a reduced portion 168 to which is integrally attached an output shaft 170. The reduced portion 168 is carried by a ball bearing assembly 172 that is in turn supported by the wall 118.

In assembling the speed change mechanism 112, the sun roller 126 and particularly the outer ring 130 thereof is deflected diametrally or radially by bending before being placed in position among the planetary rollers 142. Since the outer ring 130 is formed of steel which is deflectable and highly wear resistant, release of the sun roller after assembly results in high driving pressure among the sun roller 126, the planetary rollers 142 and the outer ring 134. High torque drive transmission is obtained without slipping while using a wear resistant traction material thereby to give long life operation.

There is placed in the bottom of the housing 114 a quantity of lubricating oil 174 which lubricates the moving parts during operation. Oil seals are provided around the wall 118 in the form of an O-ring 176 and a seal 178 formed on the ball bearing assembly 172.

The operation of the speed change mechanism 112 illustrated in FIGS. 7 and 8 is substantially the same as that shown in FIGS. 1 and 2. The most significant difference is the fact that the sun roller 126 in FIGS. 7 and 8 undergoes substantial diametral deflection whereas the sun roller 28 undergoes little if any diametral deflection. Similarly, the planetary rollers 142 of FIGS. 7 and 8 undergo only a very small amount of diametral deflection as compared to the diametral deflection undergone by planetary rollers 38 in FIGS. 1 and 2.

Wander in a longitudinal axial direction of the sun roller 126 is positively prevented by a washer 180 and the ball bearing assembly 166. Axial movement of the outer ring 134 is positively prevented by the bolts 136. Wander of the planetary rollers 142 in an axial direction is positively prevented by the washer 158 and the crank plate 156.

This application is a continuation of the copending application Serial No. 432,098, filed May 25, 1954, now abandoned, by John Thomas Parrett for Speed Changing Mechanism.

It will be seen that there have been provided speed change mechanisms which fulfill all of the objects and advantages set forth above. Although certain preferred forms of the invention have been shown for purposes of illustration, it is to be understood that the invention is to be limited only as set forth in the following claims.

1. In a speed changing device having a housing, an outer ring member mounted in the housing, a sun roller member fixed on a shaft rotatably mounted at the center of said outer ring member, at least two planetary drive roller members rotatably mounted on crank pin shafts equi-angularly spaced about a crank plate, said planetary members being pressed between said sun roller member and said ring member to provide high torque traction therewith, and means positively to prevent relative axial movement of said planetary roller members with respect to said sun roller member and said outer ring member while permitting free rotation thereof; at least one of said roller members comprising an outer metallic annular wall member and an inner metallic annular sleeve member for mounting on its respective shaft, said outer annular member being cylindrical throughout the engaging surface thereof in a non-deflected condition and being under substantial compression and substantially deflected radially by bending at the lines of pressure contact on equi-angularly spaced points of its periphery, and an elastomeric annular body disposed between said annular members and firmly bonded thereto throughout the facing surfaces thereof and forming a resilient mass to take up the deflection of said outer annular member and to transmit a uniform driving force between said annular members along the entire periphery thereof.

2. The speed changing device set forth in claim 1, wherein the outer metallic annular wall is formed of steel and the elastomeric annular body is formed of an oil resistant synthetic organic plastic material.

3. In a speed changing device having a housing, an outer ring member mounted in said housing, a sun roller member fixed on a shaft rotatably mounted at the center of said outer ring member, at least two planetary drive roller members rotatably mounted on crank pin shafts equi-angularly spaced about a crank plate, said planetary members being pressed between said sun roller member and said ring member to provide high torque traction therewith, and means positively to prevent relative axial movement of the planetary roller members with respect to said sun roller member and said outer ring member while permitting free rotation thereof; each of said planetary drive roller members having a greater diameter than said sun roller member and comprising an outer metallic annular wall member and an inner metallic annular sleeve member for mounting on its respective shaft, said outer annular member being cylindrical throughout the engaging surfaces thereof in a non-deflected condition and being under substantial compression and substantially deflected radially by bending at the lines of pressure contact on equi-angularly spaced points of its periphery, and an elastomeric annular body disposed between said annular members and firmly bonded thereto throughout the facing surfaces thereof and forming a resilient mass to take up the deflection of said outer annular member and to transmit a uniform driving force between said annular members along the entire periphery thereof.

4. In a speed changing device having a housing, an outer ring member mounted in said housing, a sun roller member fixed on a shaft rotatably mounted at the center of said outer ring member, at least two planetary drive roller members rotatably mounted on crank pin shafts equi-angularly spaced about a crank plate, said planetary members being pressed between said sun roller member and said ring member to provide high torque traction therewith, and means positively to prevent relative axial movement of said planetary roller member with respect to said sun roller member and said outer ring member while permitting free rotation thereof; said sun roller member having a diameter greater than said planetary drive roller members and comprising an outer metallic annular wall member and an inner metallic annular sleeve member for mounting on its respective shaft, said outer annular member being cylindrical throughout the engaging surface thereof in a non-deflected condition and being under substantial compression and substantially deflected radially by bending at the equi-angularly spaced lines of pressure contact on its periphery, and an elastomeric annular body disposed between said annular members and firmly bonded thereto throughout the facing surfaces thereof and to form a resilient mass to take up the deflection of said outer annular member and to transmit a uniform driving force between said annular members along the entire periphery thereof.

5. A friction transmission roller comprising an outer annular metallic member and an inner annular metallic member disposed substantially concentrically with said outer annular member, said outer annular member being cylindrical throughout the engaging surface thereof and deflectable diametrally to provide high torque transmission for frictional driving, and an elastomeric body formed of oil resistant elastomeric material disposed between said outer annular member and said inner annular member and bonded thereto to provide a unitary roller, said elastomeric body forming a resilient mass to take up the deflection of said outer annular member and to transmit a driving force between said annular members.

6. A friction transmission roller comprising an outer annular metallic member and a pair of inner annular metallic members, said inner annular members being aligned with each other and disposed substantially concentrically with respect to said outer annular member, the adjacent ends of said inner annular members abutting and the other ends of said inner annular members extending beyond the associated ends of said outer annular member, an outturned flange formed on each of said other ends of said inner annular member, said outer annular member being cylindrical throughout the engaging surface thereof and deflectable diametrally to provide high torque transmission for frictional driving, and an elastomeric body formed of oil resistant elastomeric material disposed between said outer annular member and said inner annular members and bonded thereto to provide a unitary roller, said elastomeric body forming a resilient mass to take up the deflection of said outer annular member and to transmit a driving force between said annular members.

7. A friction transmission roller comprising an outer annular metallic member and an inner unitary annular metallic member disposed substantially concentrically with said outer annular member, the outer ends of said unitary inner annular member extending beyond the ends of said outer annular member, said outer annular member being cylindrical throughout the engaging surface thereof and deflectable diametrally to provide high torque transmission for frictional driving, and an elastomeric body formed of oil resistant elastomeric material disposed between said outer annular member and said inner annular member and bonded thereto to provide a unitary roller, said elastomeric body forming a resilient mass to take up the deflection of said outer annular member and to transmit a driving force between said annular members.

8. In a speed changing device having a housing, an outer ring member mounted in the housing, a sun roller member fixed on a shaft rotatably mounted at the center of said outer ring member, three planetary drive roller members rotatably mounted on three crank pin shafts respectively equi-angularly spaced about a crank plate, said planetary members being pressed between said sun roller member and said ring member to provide high torque traction therewith, and means positively to prevent relative axial movement of said planetary members with respect to said sun member and said outer ring member while permitting free rotation thereof; at least one of said roller members comprising an outer metallic annular member and an inner metallic annular sleeve member for mounting on its respective shaft, said outer annular member being cylindrical throughout the engaging surface thereof in a non-deflected condition and being under substantial compression and substantially deflected radially by bending at the lines of pressure contact on equi-angularly spaced points of its periphery, and an elastomeric annular body disposed between said annular members and firmly bonded thereto throughout the facing surfaces thereof and forming a resilient mass to take up the deflection of said outer annular member and to transmit a uniform driving force between said annular members along the entire periphery thereof.

References Cited in the file of this patent

UNITED STATES PATENTS

| 1,928,763 | Rosenberg | Oct. 3, 1933 |
| 2,460,629 | Fawick | Feb. 1, 1949 |
| 2,578,801 | Harshberger | Dec. 18, 1951 |
| 2,774,247 | Knost | Dec. 18, 1956 |
| 2,815,685 | Parrett | Dec. 10, 1957 |

FOREIGN PATENTS

| 248,594 | Switzerland | May 15, 1947 |